US009083259B2

(12) United States Patent
Nishibori et al.

(10) Patent No.: US 9,083,259 B2
(45) Date of Patent: Jul. 14, 2015

(54) BRIDGELESS POWER FACTOR CORRECTION CIRCUIT WITH IMPROVED CRITICAL MODE (CRM) OPERATION

(75) Inventors: Kohei Nishibori, Kitasaku-gun (JP); Nadthawut Chalermboon, Kitasaku-gun (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 284 days.

(21) Appl. No.: 13/527,088

(22) Filed: Jun. 19, 2012

(65) Prior Publication Data

US 2013/0016539 A1    Jan. 17, 2013

(30) Foreign Application Priority Data

Jul. 12, 2011 (JP) .................................. 2011-153875

(51) Int. Cl.
*H02M 1/42*    (2007.01)

(52) U.S. Cl.
CPC ............ *H02M 1/4225* (2013.01); *Y02B 70/126* (2013.01)

(58) Field of Classification Search
CPC ... H02M 3/1584; H02M 1/42; H02M 1/4208; H02M 1/4225; H02M 1/4233; H02M 2001/4283
USPC .......... 323/71–272, 282–285, 351; 363/9–10, 363/44–46, 52–53, 70, 81, 84, 88–90, 363/123–127, 65
See application file for complete search history.

(56) References Cited

U.S. PATENT DOCUMENTS

| 7,269,038 | B2 * | 9/2007 | Shekhawat et al. | 363/71 |
|---|---|---|---|---|
| 7,630,221 | B2 * | 12/2009 | Sui et al. | 363/70 |
| 7,884,588 | B2 * | 2/2011 | Adragna et al. | 323/272 |
| 8,098,505 | B1 * | 1/2012 | Choi | 363/89 |
| 8,120,340 | B2 * | 2/2012 | Chen et al. | 323/272 |
| 8,279,645 | B2 * | 10/2012 | Bridge et al. | 363/65 |
| 2006/0220628 | A1 * | 10/2006 | Soldano | 323/282 |
| 2007/0058402 | A1 * | 3/2007 | Shekhawat et al. | 363/89 |
| 2009/0230929 | A1 * | 9/2009 | Sui et al. | 323/207 |
| 2010/0097041 | A1 * | 4/2010 | Ayukawa et al. | 323/272 |
| 2012/0039103 | A1 * | 2/2012 | Xu et al. | 363/126 |
| 2013/0249504 | A1 * | 9/2013 | Hsu | 323/207 |

FOREIGN PATENT DOCUMENTS

JP    A-2009-177935    8/2009

* cited by examiner

*Primary Examiner* — Timothy J Dole
*Assistant Examiner* — Ivan Laboy Andino
(74) *Attorney, Agent, or Firm* — Oliff PLC

(57) ABSTRACT

A power factor correction circuit includes: the first series circuit consisting of the first rectifier element and the first switching element; the second series circuit consisting of the second rectifier element and the second switching element; the first/second reactors; and the first/second current detectors. The first/second current detectors have each the first/second transformers, both primary parts of which consist of the first/second reactors. The first and the second switching elements are controllable based on the first output signal according to the reactor current from the secondary side of the first transformer and the second output signal according to the reactor current from the secondary side of the second transformer so as to apply a desired DC voltage to the load circuit.

5 Claims, 11 Drawing Sheets

BRIDGELESS POWER FACTOR CORRECTION CIRCUIT WITH IMPROVED CRITICAL MODE (CRM) OPERATION

BACKGROUND OF THE INVENTION

1. Field of the Invention

The present invention relates to a power factor correction circuit, and particularly to operation in a critical mode of a bridgeless power factor correction circuit.

2. Description of the Related Art

Conventionally, in order to supply electric power to a load, a power source apparatus in which an AC (alternating current) voltage from an input AC power source is rectified and then converted to a desired AC or DC (direct current) voltage and supplied to the load has been widely used. In this kind of power source apparatus, a power factor correction circuit needs to be provided in order to correct the power factor and reduce the EMI noise generated by the apparatus. Therefore, in a general constitution of a power supply apparatus, a rectification circuit consisting of a diode bridge and a power factor correction circuit consisting of a boost converter circuit are utilized in the input stage.

In recent years, in a power source apparatus, a so-called bridgeless power factor correction circuit, in which a front stage diode bridge is made unnecessary by combining a power factor correction function by a boost operation and a rectification function, has been proposed in, for example, Japanese Patent Application Laid-Open (JP-A) No. 2009-177935. In the power factor correction circuit of JP-A No. 2009-177935, the input stage of the power supply apparatus can be constituted by a simple circuit and the conduction loss of the diode can be reduced, and thus this kind of power factor correction circuit is advantageous over a constitution in which the rectification circuit and the power factor correction circuit are provided separately.

In general, a critical mode is used as an operation mode of a power factor correction circuit. In a critical mode, a point in time at which the reactor current becomes zero is detected during the period in which the main switching element is turned OFF, and the ON/OFF of the main switching element is controlled such that the main switching element is switched ON immediately after the above-mentioned point in time is detected. Therefore, in order to operate the power factor correction circuit in a critical mode, it is necessary to detect the point in time at which the reactor current becomes zero, and as such a current detection technology, a current transformer or the like has conventionally been used.

However, for example, in a current detection technology using a current transformer, there has been a problem in that an additional circuit such as a reset circuit is generally necessary in order to achieve the necessary detection accuracy, and thus the circuit constitution and the control thereof becomes complicated. Another general current detection technology is to connect a current detection resistor to the reactor current path, as in the power factor correction circuit disclosed in JP-A No. 2009-177935. However, in this case, heat generation and power loss in the resistor may become an impediment to miniaturization and efficiency improvement of the power factor correction circuit, and by extension the power supply apparatus itself.

SUMMARY OF THE INVENTION

The present invention has been made in view of the above-described problems, and an object of the invention is to provide a power factor correction circuit wherein the point in time at which the reactor current becomes zero can be detected with an inexpensive and simple circuit constitution.

The below-described embodiments exemplify constitutions of the present invention, and will be explained in an itemized manner in order to facilitate the understanding of the various constitutions of the present invention. Each item is not meant to limit the technical scope of the present invention, and substitutions or deletions of a portion of the constituent elements of each item as well as additions of other constituent elements upon referring to the detailed description of the preferred embodiments are included within the technical scope of the invention.

In order to achieve the object described above, according to the first aspect of the present invention, there is provided a power factor correction circuit comprising: the first series circuit consisting of the first rectifier element and the first switching element; the second series circuit consisting of the second rectifier element and the second switching element while connecting to the first series circuit in a parallel connection; a smoothing capacitor connecting to the first and the second series circuits and a load circuit in a parallel connection; the first reactor that has one end and the other end, the one end connecting to a connecting point of the first rectifier element and the first switching element, and the other end connecting to one end of an AC power source; the second reactor that has one end and the other end, the one end connecting to a connecting point of the second rectifier element and the second switching element, and the other end connecting to the other end of the AC power source; the third rectifier element connecting between a connecting point of the AC power source and the first reactor and a connecting point of the first switching element and the second switching element; and the fourth rectifier element connecting between a connecting point of the AC power source and the second reactor and a connecting point of the first switching element and the second switching element, wherein: 1) the power factor correction circuit further includes the first and second current detectors that detect a reactor current from the AC power source, the first current detector having the first transformer, a primary part of which consists of the first reactor, and the second current detector having the second transformer, a primary part of which consists of the second reactor; 2) the first and the second switching elements are controllable based on the first output signal output according to the reactor current from the secondary side of the first transformer and the second output signal output according to the reactor current from the secondary side of the second transformer; and 3) a desired DC voltage is allowed to supply to the load circuit.

According to the first aspect of the present invention, the first and the second output signals are generable based on an induced voltage to be generated on each secondary side of the first and the second transformer, and a polarity of the induced voltage to be generated on the secondary side of the first transformer in accordance with ON/OFF of the first switching element in a positive half cycle of the AC power source is adapted to match a polarity of the induced voltage to be generated on the secondary side of the second transformer in accordance with ON/OFF of the second switching element in a negative half cycle of the AC power source.

According to the first aspect of the present invention, an output end of the first output signal on the secondary side of the first transformer is adapted to be commonly shared with an output end of the second output signal on the secondary side of the second transformer.

According to the first aspect of the present invention, on each secondary side of the first and the second transformers, the following rectifier elements are each connected: 1) a rectifier element to be conducted when a positive voltage is generated at the first transformer; and a rectifier element to be conducted when a positive voltage is generated on the secondary side of the second transformer.

Since the power factor correction circuit of the present invention is constructed as described hereinabove, in a bridgeless power factor correction circuit, it makes possible to detect a point where a reactor current becomes zero based on low-cost and simplified circuit structures.

DETAILED DESCRIPTION OF THE PREFERRED EMBODIMENTS

Figure 1:
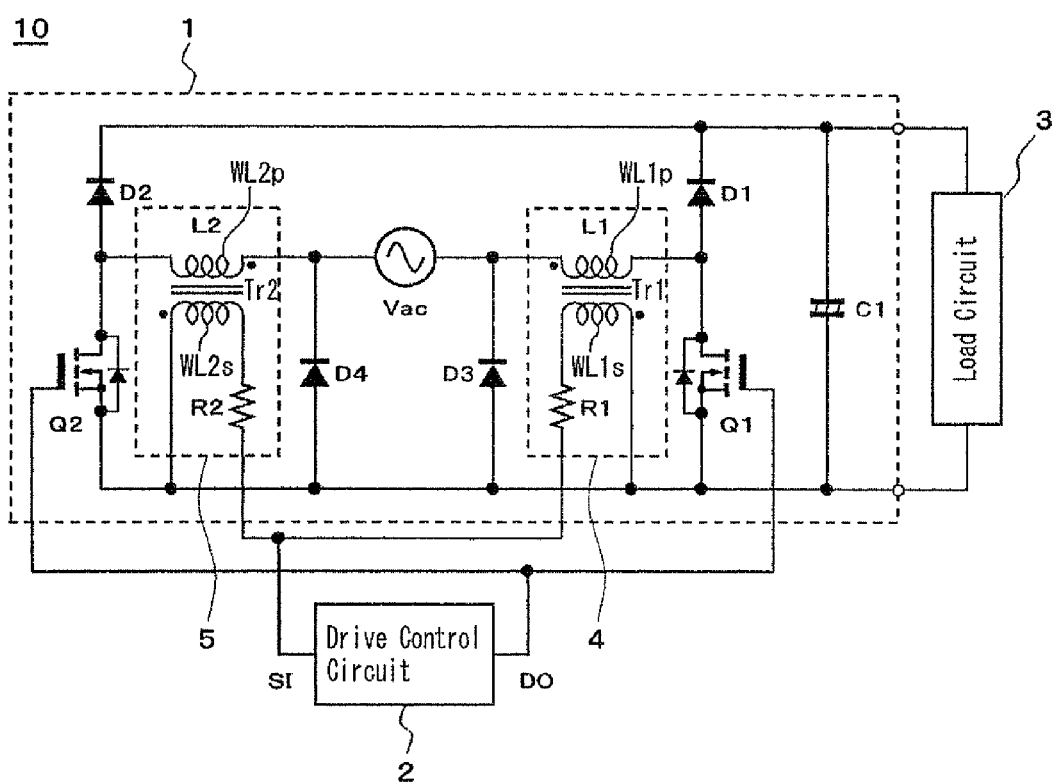
FIG. 1 is a block diagram indicating a power unit provided with a power factor correction circuit according to the first embodiment of the present invention.

Hereinafter, embodiments of the present invention will be described with reference to the attached drawings. FIG. 1 is a circuit constitution diagram illustrating a power supply apparatus 10 including a power factor correction circuit 1 according to the first embodiment of the present invention. In the power supply apparatus 10, the power factor correction circuit 1 functions to rectify, boost, and correct the power factor of an AC voltage of an AC power source Vac, and then apply it to a load circuit 3. Therein, the load circuit 3 is typically constituted by a DC-DC converter circuit or a DC-AC converter circuit, and the power factor correction circuit 1 constitutes an input stage of the power supply apparatus 10 that on the whole forms an AC-DC converter or an AC-AC converter. However, the present invention is not limited by the specific constitution of the load circuit 3, and any appropriate circuit can be used.

The power factor correction circuit 1 includes the first series circuit consisting of the first rectifier element D1 and the first switching element Q1, and the second series circuit consisting of the second rectifier element D2 and the second switching element Q2. In the power factor correction circuit 1, diodes are used as the first and second rectifier elements D1 and D2, and MOS-FETs are used as the first and second switching elements Q1 and Q2. In the first series circuit, the anode terminal of the first rectifier element D1 is connected to the drain terminal of the first switching element Q1, and in the second series circuit, the anode terminal of the second rectifier element D2 is connected to the drain terminal of the second switching element Q2.

In the first series circuit and the second series circuit, the cathode terminals of the first and second rectifier elements D1 and D2 are connected to each other, and the source terminals of the first and second switching elements Q1 and Q2 are connected to each other, and these connections are in parallel. Further, one end of a smoothing capacitor C1 is connected to the connecting point of the cathode terminals of the first and second rectifier elements D1 and D2, and the other end of the smoothing capacitor C1 is connected to the connecting point of the source terminals of the first and second switching elements Q1 and Q2. In this way, the smoothing capacitor C1 is connected in parallel to the first series circuit and the second series circuit. The load circuit 3 of the power factor correction circuit 1 is connected in parallel to the smoothing capacitor C1.

The power factor correction circuit 1 also includes the first reactor L1 and the second reactor L2. One end of the first reactor L1 is connected to the connecting point of the first rectifier element D1 and the first switching element Q1, and the other end of the first reactor L1 is connected to one end of the AC power source Vac. One end of the second reactor L2 is connected to the connecting point of the second rectifier element D2 and the second switching element Q2, and the other end of the second reactor L2 is connected to the other end of the AC power source Vac.

The power factor correction circuit 1 further includes third and fourth rectifier elements D3 and D4, which each consist of a diode. The cathode terminal of the third rectifier element D3 is connected to the connecting point of the AC power source Vac and the first reactor L1, and the anode terminal of the third rectifier element D3 is connected to the connecting point on the source terminal side of the first and second switching elements Q1 and Q2 of the first series circuit and the second series circuit. The cathode terminal of the fourth rectifier element D4 is connected to the connecting point of the AC power source Vac and the second reactor L2, and the anode terminal of the fourth rectifier element D4 is connected to the connecting point on the source terminal side of the first and second switching elements Q1 and Q2 of the first series circuit and the second series circuit.

Below, the connecting line of the source terminals of the first and second switching elements Q1 and Q2, the anode terminals of the third and fourth rectifier elements D3 and D4, and the one end of the smoothing capacitor C1 will also be referred to as the common line.

The power factor correction circuit 1 includes a drive control circuit 2 that controls the ON/OFF operation of the first and second switching elements Q1 and Q2. The ON/OFF operation of the first and second switching elements Q1 and Q2 is executed as will be explained below in accordance with a drive signal (in this case, a gate drive signal) that is output from a drive signal output terminal DO of the drive control circuit 2. Thereby, the power factor correction circuit 1 functions as a power factor correction circuit that includes a rectification means and a boosting means for both the first and second switching elements Q1 and Q2.

The power factor correction circuit 1 also includes the first and second current detectors 4 and 5 that respectively have first and second transformers Tr1 and Tr2. The first transformer Tr1 includes a primary winding WL1p that constitutes the first reactor L1 and the secondary winding WL1s that is magnetically coupled to the primary winding WL1p. The second transformer Tr2 includes a primary winding WL2p that constitutes the second reactor L2 and the secondary winding WL2s that is magnetically coupled to the primary winding WL2p.

The first current detector 4 also includes a resistor R1, one end of which is connected to one end of the secondary winding WL1s, and the other end of the resistor R1 constitutes an output end of the first current detector 4. Similarly, the second current detector 5 also includes a resistor R2, one end of which is connected to one end of the secondary winding WL2s, and the other end of the resistor R2 constitutes an output end of the second current detector 5. The other ends of the second windings WL1s and WL2s are connected to the common line. In the power factor correction circuit 1, the output end of the first current detector 4 and the output end of the second current detector 5 are connected to each other so that they are commonly shared to each other, and the output ends commonly shared are connected to a zero current detection terminal SI of the drive control circuit 2.

Figure 2:
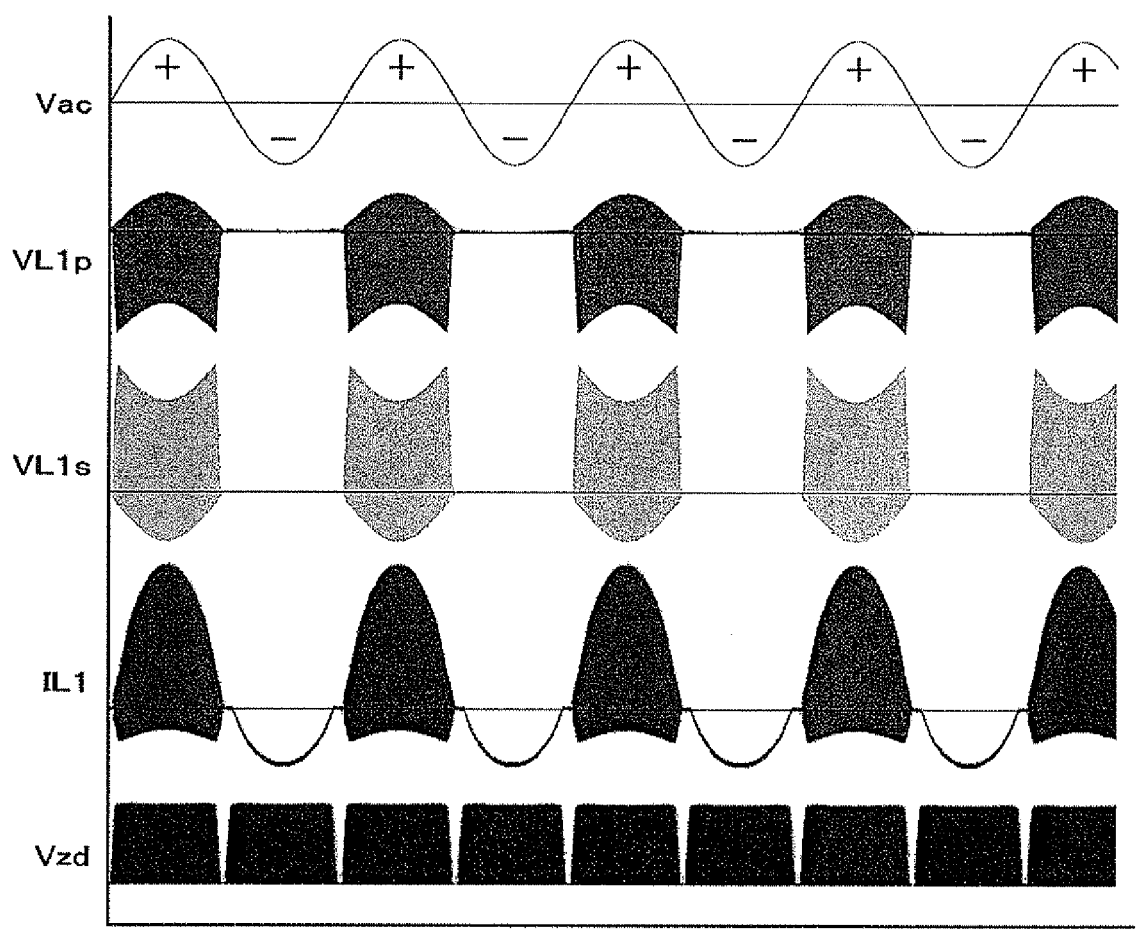
FIG. 2 is a waveform diagram indicating an operation of main parts of the power factor correction circuit shown in FIG. 1.

The power factor correction circuit 1 realizes operation in a critical mode by detecting a reactor current from the AC power source Vac using the first and second current detectors 4 and 5. This operation will be explained in detail below referring to FIGS. 1 and 2, In the following explanation, the half cycle in which the output end on the first reactor L1 side among the output ends of the AC power source Vac becomes high voltage is referred to as a positive half cycle (shown by the symbol "+" in FIG. 2), and the half cycle in which the output end on the second reactor L2 side becomes high voltage is referred to as a negative half cycle (shown by the symbol "−" in FIG. 2). FIG. 2 illustrates a voltage waveform of the AC power source Vac, and also illustrates a voltage VL1p across the first reactor L1 (primary winding WL1p), a voltage VL1s across the secondary winding WL1s, a reactor current IL1 that flows to the first reactor L1 (primary winding WL1p), and an input voltage (zero current detection voltage) Vzd of the zero current detection terminal SI of the drive control circuit 2. However, with regard to the voltage VL1p across the first reactor L1 (primary winding WL1p) and the voltage VL1s across the secondary winding WL1s, only the waveform in the positive half cycle is illustrated.

As will be explained below, the waveforms of VL1p, VL1s, IL1 and Vzd in the positive half cycle oscillate in accordance with the ON/OFF operation of the first switching element Q1, and the waveform of Vzd in the negative half cycle oscillates in accordance with the ON/OFF operation of the second switching element Q2. However, for the sake of explanation, FIG. 2 is illustrated with a time scale such that the waveforms are shown as regions that are entirely filled in. Therefore, the top and the bottom of the filled region of each waveform respectively represent a maximum envelope and a minimum envelope for one cycle of the ON/OFF operation of the first switching element Q1 (or the second switching element Q2).

In the power factor correction circuit, a current path is formed in the positive half cycle in which, while the first switching element Q1 is turned on, a reactor current flows from the AC power source Vac to the first reactor L1 and then between the source and drain of the first switching element Q1. A reactor current IL1 that flows to the first reactor L1 gradually increases and energy in accordance with the current value is stored in the first reactor L1. Next, if the first switching element Q1 is turned OFF, a current path is formed in which a reactor current flows from the AC power source Vac to the first reactor L1 and then through the first rectifier element D1 to charge the smoothing capacitor C1. The energy that was stored in the first reactor L1 while the first switching element Q1 was ON is transferred to the smoothing capacitor C1. During this time, the reactor current IL1 gradually decreases, with a peak value occurring immediately before the first switching element Q1 is turned OFF.

In the power factor correction circuit 1, the primary and secondary windings WL1p and WL1s of the transformer Tr1 are wound such that the induced voltage VL1s that is generated in the secondary winding WL1s in accordance with the voltage VL1p across the primary winding WL1p becomes a negative voltage on the output end side relative to the common line (hereinafter also referred to simply as a negative voltage) while the first switching element Q1 is turned ON, and becomes a positive voltage on the output end side relative to the common line (hereinafter also referred to simply as a positive voltage) while the first switching element Q1 is turned OFF.

From the first current detector 4, an output voltage (hereinafter referred to as a zero current detection voltage) Vzd in accordance with the induced voltage VL1s generated in the secondary winding WL1s is output as the first output signal, and input into the zero current detection terminal SI of the drive control circuit 2. The drive control circuit 2 detects a point in time at which the reactor current IL1 (a reactor current from the AC power source Vac) of the first reactor L1 becomes zero based on a change in the zero current detection voltage Vzd.

The drive control circuit 2 is configured to turn ON the first switching element Q1 immediately after the zero current detection time point, and then turn OFF the first switching element Q1 again after a predetermined duration of time has passed. By repeating the ON/OFF operation of the first switching element Q1 in this way during the positive half cycle, the power factor correction circuit 1 is operated in a critical mode and a desired DC voltage is supplied to the load circuit 3.

In the power factor correction circuit 1, a positive voltage clamp circuit and a negative voltage clamp circuit (not illustrated), which are for respectively clamping the positive voltage and the negative voltage of the induced voltage VL1s of the secondary winding WL1s to a fixed High level and Low level, are built into the drive control circuit 2. Thereby, the zero current detection voltage Vzd is formed into a rectangular waveform that oscillates between the High level and the Low level. In the drive control circuit 2, a threshold voltage is set to an appropriate level between the High level and the Low level. The point in time at which the reactor current IL1 becomes zero is determined by detecting a drop in the zero current detection voltage Vzd from the High level.

In the power factor correction circuit 1, in the negative half circuit, ON/OFF operation control of the second switching element Q2 similar to that of the first switching element Q1 is executed as follows. In the following explanation, the voltage across the second reactor L2 (primary winding WL2p), the voltage across the secondary winding WL2s, and the reactor current that flows to the second reactor L2 (primary winding WL2p) are not illustrated, but these voltages are respectively similar to VL1p, VL1s, and IL1 illustrated in FIG. 2, and thus they will be respectively referred to with the reference numerals VL2p, VL2s, and IL2 below.

A current path is formed in the negative half cycle in which, while the second switching element Q2 is turned on, a reactor current flows from the AC power source Vac to the second reactor L2 and then between the source and drain of the second switching element Q2. A reactor current IL2 that flows to the second reactor L2 gradually increases and energy in accordance with the current value is stored in the second reactor L2. Next, if the second switching element Q2 is turned OFF, a current path is formed in which a reactor current flows from the AC power source Vac to the second reactor L2 and then through the second rectifier element D2 to charge the smoothing capacitor C1. The energy that was stored in the second reactor L2 while the second switching element Q2 was ON is transferred to the smoothing capacitor C1. During this time, the reactor current IL2 gradually decreases, with a peak value occurring immediately before the first switching element Q1 is turned OFF.

In the power factor correction circuit 1, the primary and secondary windings WL2p and WL2s of the transformer Tr2 are wound such that the induced voltage VL2s that is generated in the secondary winding WL2s in accordance with the voltage VL2p across the primary winding WL2p becomes a negative voltage on the output end side relative to the common line (hereinafter also referred to simply as a negative voltage) while the second switching element Q2 is turned ON, and becomes a positive voltage on the output end side relative to the common line (hereinafter also referred to simply as a positive voltage) while the second switching element Q2 is turned OFF.

In other words, in the negative half cycle of the AC power source Vac, the polarity of the induced voltage generated on the secondary side of the second transformer Tr2 in accordance with the ON/OFF of the second switching element Q2 matches the polarity of the induced voltage generated on the secondary side of the first transformer Tr1 in accordance with the ON/OFF of the first switching element Q1.

From the second current detector 5, a zero current detection voltage Vzd in accordance with the induced voltage VL2s generated in the secondary winding WL2s is output as the second output signal, and input into the zero current detection terminal SI of the drive control circuit 2. The drive control circuit 2 detects a point in time at which the reactor current IL2 (a reactor current from the AC power source Vac) of the second reactor L2 becomes zero based on a change in the zero current detection voltage Vzd.

At this time, in the negative half cycle, the positive voltage clamp circuit and the negative voltage clamp circuit that are built into the drive control circuit 2 function in the same way as in the positive half cycle on the positive voltage and the negative voltage of the induced voltage VL2s of the secondary winding WL2s. Thereby, the zero current detection voltage Vzd is formed into a rectangular waveform that oscillates between the High level and the Low level. In the drive control circuit 2, as in the positive half cycle, the point in time at which the reactor current IL2 becomes zero is determined by detecting a drop of the zero current detection voltage Vzd from the High level based on the set threshold voltage.

The drive control circuit 2 is configured to turn ON the second switching element Q2 immediately after the zero current detection time point, and then turn OFF the second switching element Q2 again after a predetermined duration of time has passed. By repeating the ON/OFF operation of the second switching element Q2 in this way during the negative half cycle, the power factor correction circuit 1 is operated in a critical mode and a desired DC voltage is supplied to the load circuit 3.

In this way, in the power factor correction circuit 1, the first and second transformers Tr1 and Tr2 are configured such that the polarity of the induced voltage generated on the secondary side of the first transformer Tr1 in accordance with the ON/OFF of the first switching element Q1 in the positive half cycle of the AC power source Vac matches the polarity of the induced voltage generated on the secondary side of the second transformer Tr2 in accordance with the ON/OFF of the second switching element Q2 in the negative half cycle of the AC power source Vac. Therefore, by directly connecting the output end of the first output signal (zero current detection voltage Vzd) on the secondary side of the first transformer Tr1 and the output end of the second output signal (zero current detection voltage Vzd) on the secondary side of the second transformer Tr2, the output ends of the zero current detection voltages are commonly shared to each other, and drive control of the bridgeless power factor correction circuit 1 including the first and second switching elements Q1 and Q2 can be executed using an inexpensive drive control circuit 2 that has only a drive control function for one switching element.

In the power factor correction circuit 1, as one preferred embodiment, the drive control circuit 2 is constituted using an inexpensive, general-purpose IC originally configured to carry out drive control of a single switching element. Therefore, in the drive control circuit 2, the gate terminals of the first and second switching elements Q1 and Q2 are also connected to each other, and then connected to a single drive signal output terminal DO of the drive control circuit 2. Accordingly, the ON/OFF operations of the first and second switching elements Q1 and Q2 are actually carried out simultaneously in accordance with a common gate drive signal over the entire cycle of the AC power source Vac. However, in the second switching element Q2 in the positive half cycle and the first switching element Q1 in the negative half cycle, a parasitic diode (if it exists) merely constitutes a portion of the return path of the reactor current, and the ON/OFF operation in each half cycle does not influence the critical mode operation of the power factor correction circuit 1 described above.

However, in the power factor correction circuit of the present invention, the drive control circuit 2 may independently generate and output a gate drive signal of the first switching element Q1 and gate drive signal of the second switching element Q2.

In addition, in the power factor correction circuit 1, as shown in FIG. 2, the reactor current IL1 (for example, a return current via a parasitic diode of the first switching element Q1) flows to the first reactor IL1 in the negative half cycle as well. However, as can be understood from FIG. 2, fluctuations in the reactor current IL1 are extremely slow compared to the fluctuations of the reactor current IL1 in the positive half cycle, and have almost no effect on the zero current detection voltage Vzd output from the second current detector 5 based on the ON/OFF operation of the second switching element Q2 in the negative half cycle. Similarly, the reactor current IL2 that flows to the second reactor IL2 in the positive half cycle has almost no effect on the zero current detection voltage Vzd output from the first current detector 4 based on the ON/OFF operation of the first switching element Q1. Therefore, in this way, even if the reactor current IL1 in the negative half cycle and the reactor current IL2 in the positive half cycle exist, the zero current detection voltages Vzd input to the zero current detection terminal SI of the drive control circuit 2 can be essentially regarded as being alternately output in each half cycle of the AC power source Vac from the first current detector 4 and the second current detector 5, and it is possible to connect the output ends of the zero current detection voltages Vzd to integrate the detection line of the zero current.

In the power factor correction circuit 1, the positive voltage clamp circuit and the negative voltage clamp circuit are provided to the drive control circuit 2. However, in the power factor correction circuit of the present invention, the drive control circuit 2 may have only one or neither of the positive voltage clamp circuit and the negative voltage clamp circuit. In accordance with such a constitution, one or both of the positive voltage and the negative voltage of the induced voltages VL1s and VL2s generated in the secondary windings WL1s and WL2s of each transformer Tr1 and Tr2 may be input as is into the zero current detection terminal SI of the drive control circuit 2.

Next, referring to FIGS. 3 to 9, further embodiments of the present invention will be explained. However, in the following explanations of the embodiments, explanations of portions which are the same upon comparison with any of the embodiments that have already been explained are appropriately omitted and the points of difference thereof will be the focus of the explanations.

Figure 3:
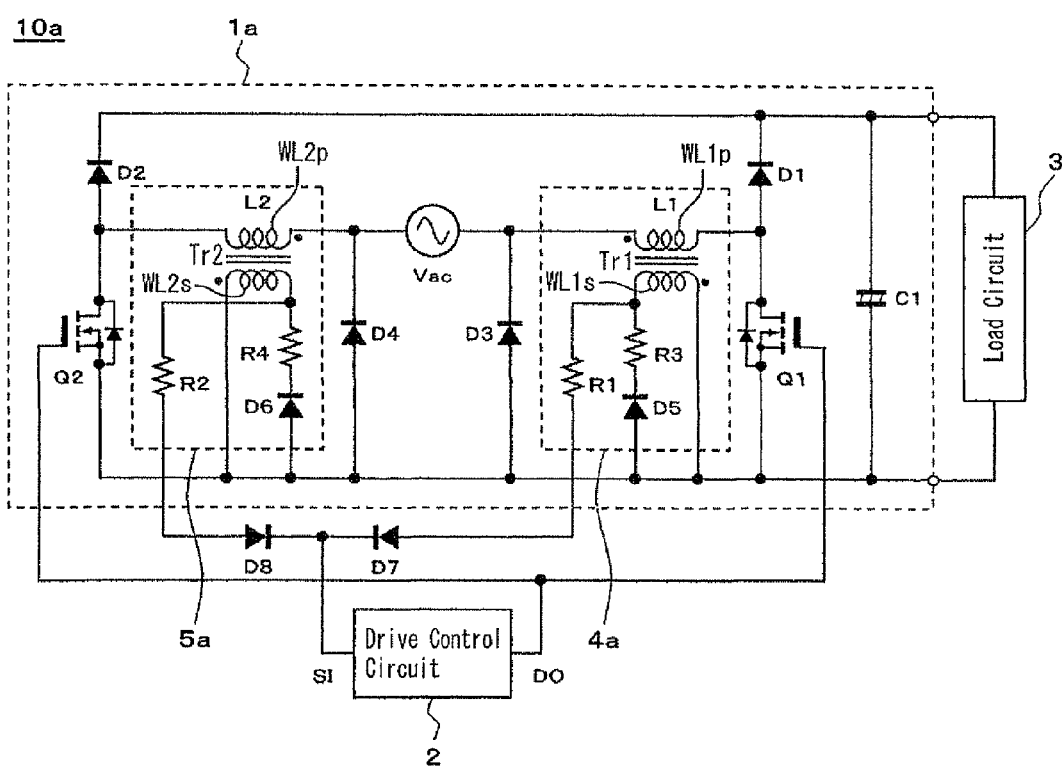
FIG. 3 is a block diagram indicating a power unit provided with a power factor correction circuit according to the second embodiment of the present invention.

FIG. 3 is a circuit constitution diagram illustrating a power supply apparatus 10a including a power factor correction circuit 1a according to the second embodiment of the present invention. The power factor correction circuit 1a differs from the power factor correction circuit 1 illustrated in FIG. 1 with respect to the following points. In the power factor correction circuit 1a, one end of a resistor R3 is connected to the connecting point of the secondary winding WL1s of the first transformer Tr1 and the resistor R1, the cathode terminal of the fifth rectifier element (diode) D5 is connected to the other end of the resistor R3, and the anode terminal of the fifth rectifier element D5 is connected to the common line. Similarly, one end of a resistor R4 is connected to the connecting point of the secondary winding WL2s of the second transformer Tr2 and the resistor R2, the cathode terminal of the sixth rectifier element (diode) is connected to the other end of the resistor R4, and the anode terminal of the sixth rectifier element D6 is connected to the common line.

In addition, the power factor correction circuit 1a includes the seventh rectifier element (diode) D7 whose anode terminal is connected to the output end of the first current detector 4a, and an eighth rectifier element (diode) D8 whose anode terminal is connected to the output end of the second current detector 5a. The cathode terminals of the seventh rectifier element D7 and the eighth rectifier element D8 are connected to each other. The output end of the first current detector 4a and the output end of the second current detector 5a are commonly shared via the seventh and eighth rectifier elements D7 and D8, and connected to the zero current detection terminal SI of the drive control circuit 2.

In the power factor correction circuit 1a, in the positive half cycle, when a positive voltage is generated in the secondary winding WL1s of the first transformer Tr1, the seventh rectifier element D7 conducts it and the zero current detection voltage Vzd is output from the first current detector 4a to the drive control circuit 2. Similarly, in the negative half cycle, when a positive voltage is generated in the secondary winding WL2s of the second transformer Tr2, the eighth rectifier element D8 conducts it and the zero current detection voltage Vzd is output from the second current detector 5a to the drive control circuit 2. Meanwhile, the current path from the secondary winding WL1s of the first transformer Tr1 to the secondary winding WL2s of the second transformer Tr2 is blocked by the eighth rectifier element D8, and the current path from the secondary winding WL2s of the second transformer Tr2 to the secondary winding WL1s of the first transformer Tr1 is blocked by the seventh rectifier element D7. Therefore, by preventing interference between the two secondary windings WL1s and WL2s, the point in time at which the reactor currents IL1 and IL2 become zero can be more stably detected.

When a negative voltage is generated in the secondary winding WL1s of the first transformer Tr1, the fifth rectifier element D5 conducts it, and thereby the series circuit of the fifth rectifier element D5 and the resistor R3 (current-limiting resistor) functions as a negative voltage clamp circuit. Similarly, when a negative voltage is generated in the secondary winding WL2s of the second transformer Tr2, the sixth rectifier element D6 conducts it, and thereby the series circuit of the sixth rectifier element D6 and the resistor R4 (current-limiting resistor) functions as a negative voltage clamp circuit.

Figure 4:
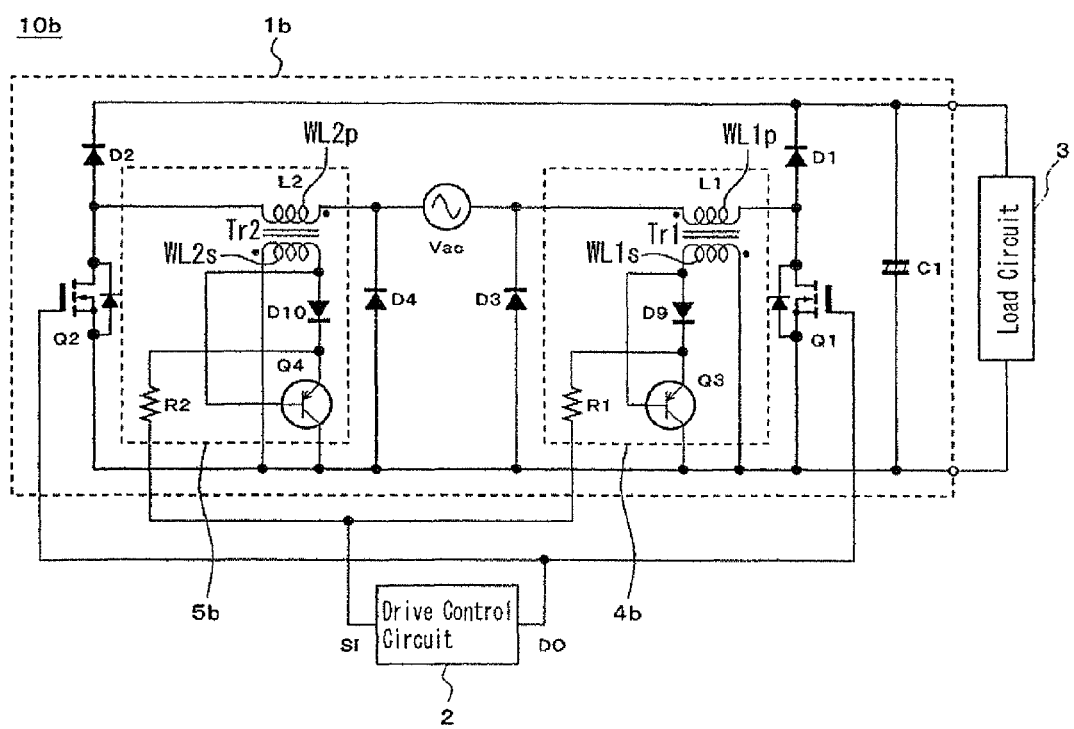
FIG. 4 is a block diagram indicating a power unit provided with a power factor correction circuit according to the third embodiment of the present invention.

FIG. 4 is a circuit constitution diagram illustrating a power supply apparatus 10b including a power factor correction circuit 1b according to the third embodiment of the present invention. The power factor correction circuit 1b differs from the power factor correction circuit 1 illustrated in FIG. 1 with respect to the following points. In the power factor correction circuit 1b, the secondary winding WL1s of the first transformer Tr1 and the resistor R1 are connected via a ninth rectifier element (diode) D9, the anode terminal of the ninth rectifier element D9 is connected to one end of the secondary winding WL1s, and the cathode terminal of the ninth rectifier element D9 is connected to one end of the resistor R1.

The cathode terminal of the ninth rectifier element D9 is connected to an emitter terminal of the third switching element Q3 consisting of a PNP transistor. The connecting point of the anode terminal of the ninth rectifier element D9 and the secondary winding WL1s is connected to a base terminal of the third switching element Q3, and a collector terminal of the third switching element Q3 is connected to the common line.

Similarly, the secondary winding WL2s of the second transformer Tr2 and the resistor R2 are connected via a tenth rectifier element (diode) D10, the anode terminal of the tenth rectifier element D10 is connected to one end of the secondary winding WL2s, and the cathode terminal of the tenth rectifier element D10 is connected to one end of the resistor R2. The cathode terminal of the tenth rectifier element D10 is connected to an emitter terminal of the fourth switching element Q4 consisting of a PNP transistor. The connecting point of the anode terminal of the tenth rectifier element D10 and the secondary winding WL2s is connected to a base terminal of the fourth switching element Q4, and a collector terminal of the fourth switching element Q4 is connected to the common line.

In the power factor correction circuit 1b, the ninth rectifier element D9 and the tenth rectifier element D10 exhibit the same operational effects as the seventh rectifier element D7 and the eighth rectifier element D8 in the power factor correction circuit 1a illustrated in FIG. 3. The third switching element Q3 and the fourth switching element Q4 function as negative voltage clamp circuits by turning ON when a negative voltage is generated in the secondary winding WL1s and the secondary winding WL2s.

Figure 5:
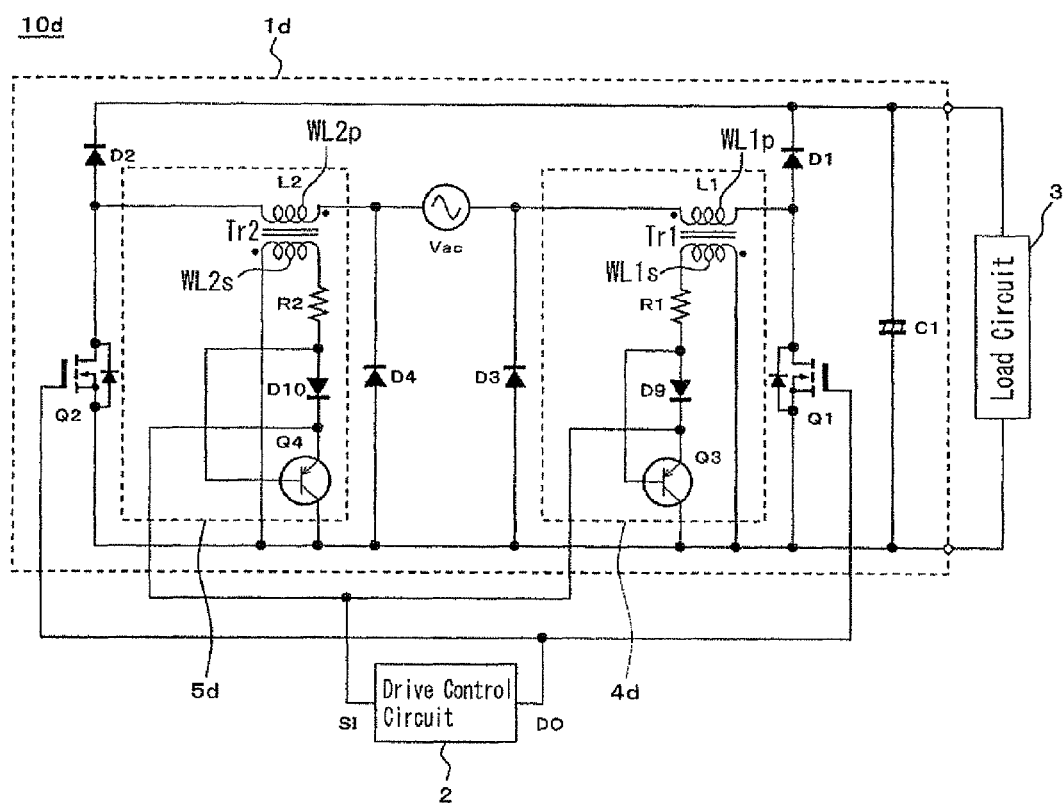
FIG. 5 is a block diagram indicating a power unit provided with a power factor correction circuit according to the fourth embodiment of the present invention.

FIG. 5 is a circuit constitution diagram illustrating a power supply apparatus 10d including a power factor correction circuit 1d according to the fourth embodiment of the present invention. The power factor correction circuit 1d differs from the power factor correction circuit 1b in FIG. 4 in that the resistor R1 of the first current detector 4d is provided between the ninth rectifier element D9 and the secondary winding WL1s, and the resistor R2 of the second current detector 5d is provided between the tenth rectifier element D10 and the secondary winding WL2s.

According to this constitution, in the power factor correction circuit 1d, in the first current detector 4d, the resistor R1 functions as a control resistor of the output current from the secondary winding WL1s, and lowers the voltage applied to the third switching element Q3 and the ninth rectifier element D9 by voltage division. Thereby, the necessary voltage withstanding performance for the third switching element Q3 and the ninth rectifier element D9 can be minimized, and thus a reduction in the cost of the apparatus can be achieved. The operational effect of the resistor R2 in the second current detector 5d is the same as that of the resistor R1 in the first current detector 4d.

Figure 6:
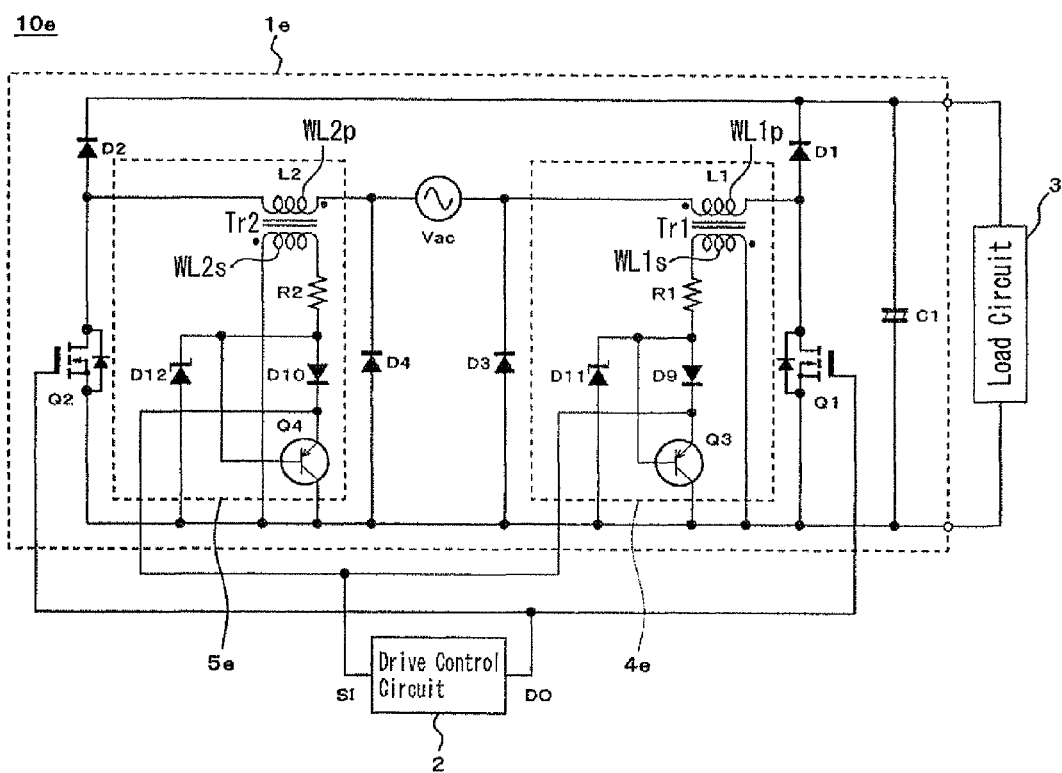
FIG. 6 is a block diagram indicating a power unit provided with a power factor correction circuit according to the fifth embodiment of the present invention.

FIG. 6 is a circuit constitution diagram illustrating a power supply apparatus 10e including a power factor correction circuit 1e according to the fifth embodiment of the present invention. The power factor correction circuit 1e differs from the power factor correction circuit 1d illustrated in FIG. 5 in that an eleventh rectifier element D11 consisting of a zener diode is provided to the first current detector 4e and a twelfth rectifier element D12 consisting of a zener diode is provided to the second current detector 5e. The cathode terminal of the eleventh rectifier element D11 is connected to the connecting point of the ninth rectifier element D9 and the resistor R1, and the anode terminal of the eleventh rectifier element D11 is connected to the common line. The eleventh rectifier element D11 functions as a positive voltage clamp circuit when a positive voltage is generated in the secondary winding WL1s. Similarly, the cathode terminal of the twelfth rectifier element D12 is connected to the connecting point of the tenth rectifier element D10 and the resistor R2, and the anode terminal of the twelfth rectifier element D12 is connected to the common line. The twelfth rectifier element D12 functions as a positive voltage clamp circuit when a positive voltage is generated in the secondary winding WL2s.

The power factor correction circuit 1e is a suitable constitution in the case that, for example, there is a limit in the applied positive voltage of the zero current detection terminal SI of the drive control circuit 2 and a positive voltage clamp circuit is not built into the drive control circuit 2. In this case, the zener voltages of the eleventh and twelfth rectifier elements D11 and D12 are appropriately selected in accordance with the specifications of the drive control circuit 2.

Figure 7:
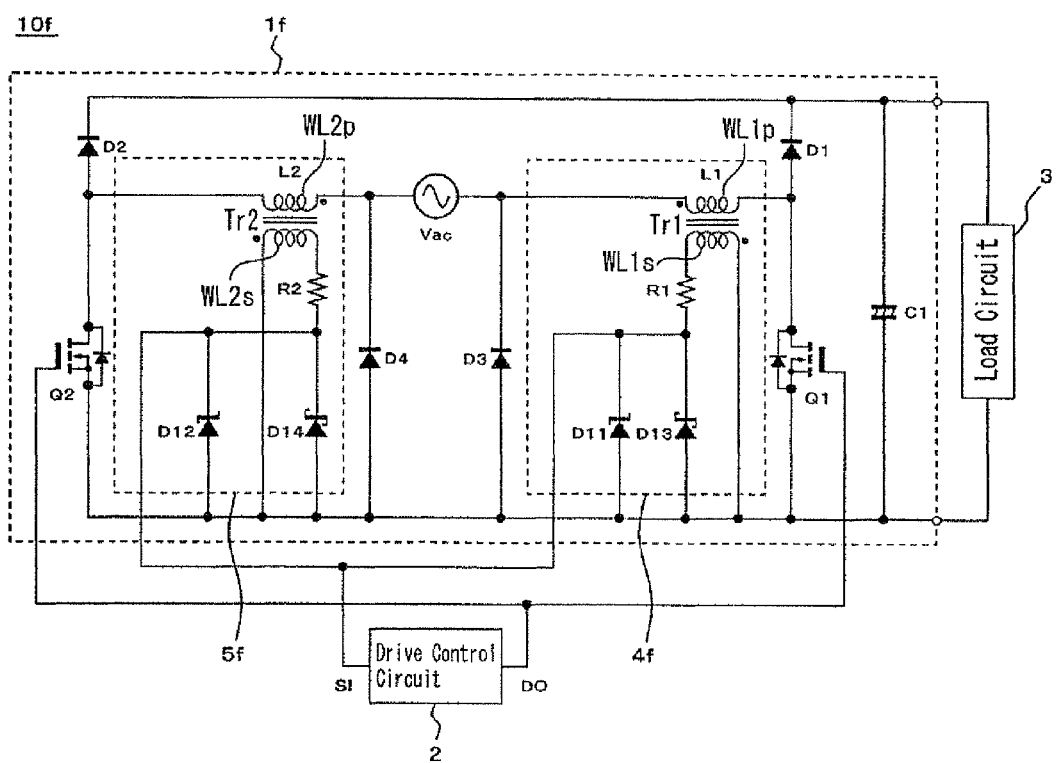
FIG. 7 is a block diagram indicating a power unit provided with a power factor correction circuit according to the sixth embodiment of the present invention.

FIG. 7 is a circuit constitution diagram illustrating a power supply apparatus 10f including a power factor correction circuit 1f according to the sixth embodiment of the present invention. The power factor correction circuit 1f differs from the power factor correction circuit 1e illustrated in FIG. 6 in that the ninth rectifier element D9 is eliminated, the third switching element Q3 is replaced with a thirteenth rectifier element D13 consisting of a Schottky barrier diode, the tenth rectifier element D10 is eliminated, and the fourth switching element Q4 is replaced with a fourteenth rectifier element D14 consisting of a Schottky barrier diode.

The cathode terminal of the thirteenth rectifier element D13 is connected to the connecting point of the eleventh rectifier element D11 and the resistor R1, and the anode terminal thereof is connected to the common line. The thirteenth rectifier element D13 functions as a negative voltage clamp circuit when a negative voltage is generated in the secondary winding WL1s. Similarly, the cathode terminal of the fourteenth rectifier element D14 is connected to the connecting point of the twelfth rectifier element D12 and the resistor R2, and the anode terminal thereof is connected to the common line. The fourteenth rectifier element D14 functions as a negative voltage clamp circuit when a negative voltage is generated in the secondary winding WL2s. The thirteenth and fourteenth rectifier elements D13 and D14 also operate to shorten the discharge time when the AC power source Vac is stopped.

A Schottky barrier diode has characteristics in which the voltage drop in the forward direction is small (for example, approximately 0.3 V) compared to a PN junction diode and the switching speed is high. Therefore, a Schottky barrier diode can be advantageously used as a negative voltage clamp circuit. The constitution of the power factor correction circuit 1f can achieve simplification of the circuit and a reduction in the cost of the apparatus in the case that a negative voltage clamp circuit needs to be provided in accordance with the specifications of the drive control circuit 2.

Figure 8:
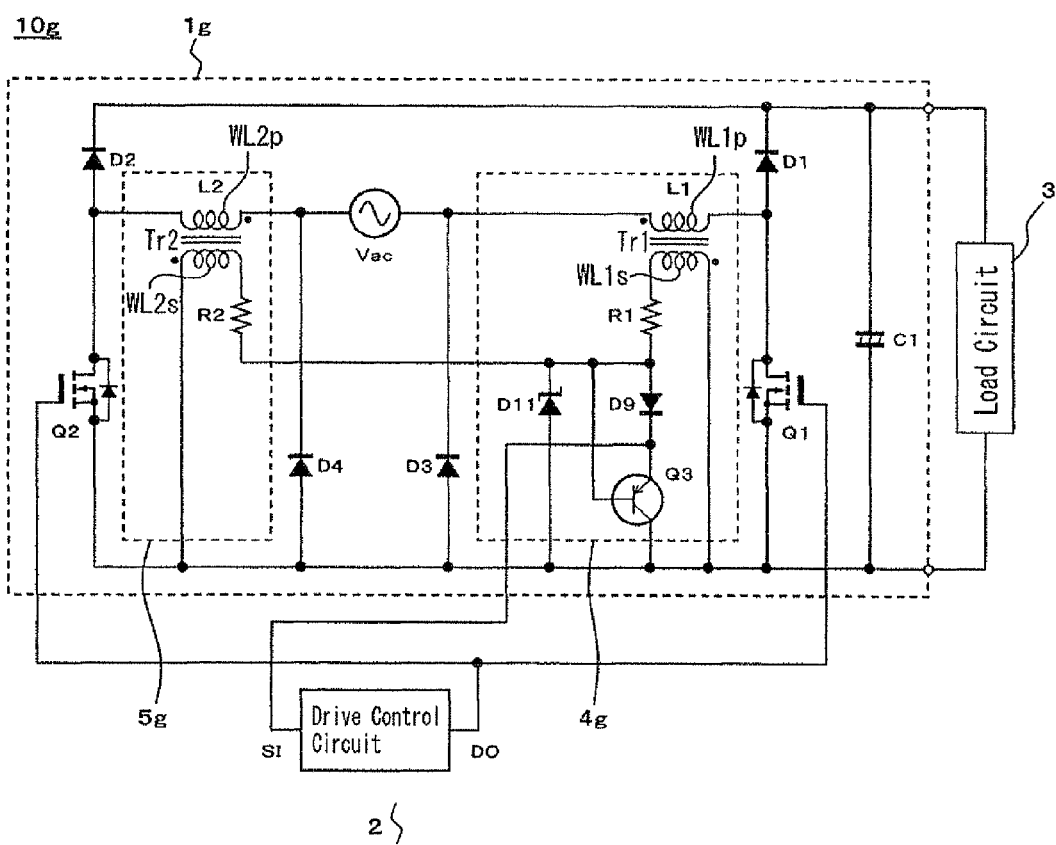
FIG. 8 is a block diagram indicating a power unit provided with a power factor correction circuit according to the seventh embodiment of the present invention.

FIG. 8 is a circuit constitution diagram illustrating a power supply apparatus 10g including a power factor correction circuit 1g according to the seventh embodiment of the present invention. The power factor correction circuit 1g differs from the power factor correction circuit 1e illustrated in FIG. 6 with the respect to the following points. In the power factor correction circuit 1g, the tenth rectifier element D10, the fourth switching element Q4, and the twelfth rectifier element D12 are eliminated from the constitution of the power factor correction circuit 1e, and one end on the side that is not connected to the secondary winding WL2s of the resistor R2 of the second current detector 5g and one end of the side that is not connected to the secondary winding WL1s of the resistor R1 of the first current detector 4g are connected to each other. Thereby, the power factor correction circuit 1g has a constitution including both a positive voltage clamp circuit and a negative voltage clamp circuit by the first current detector 4g and the second current detector 5g. Thereby, the circuit constitution of the power factor correction circuit 1g can be simplified, and a reduction in the cost of the apparatus can be achieved.

Figure 9:
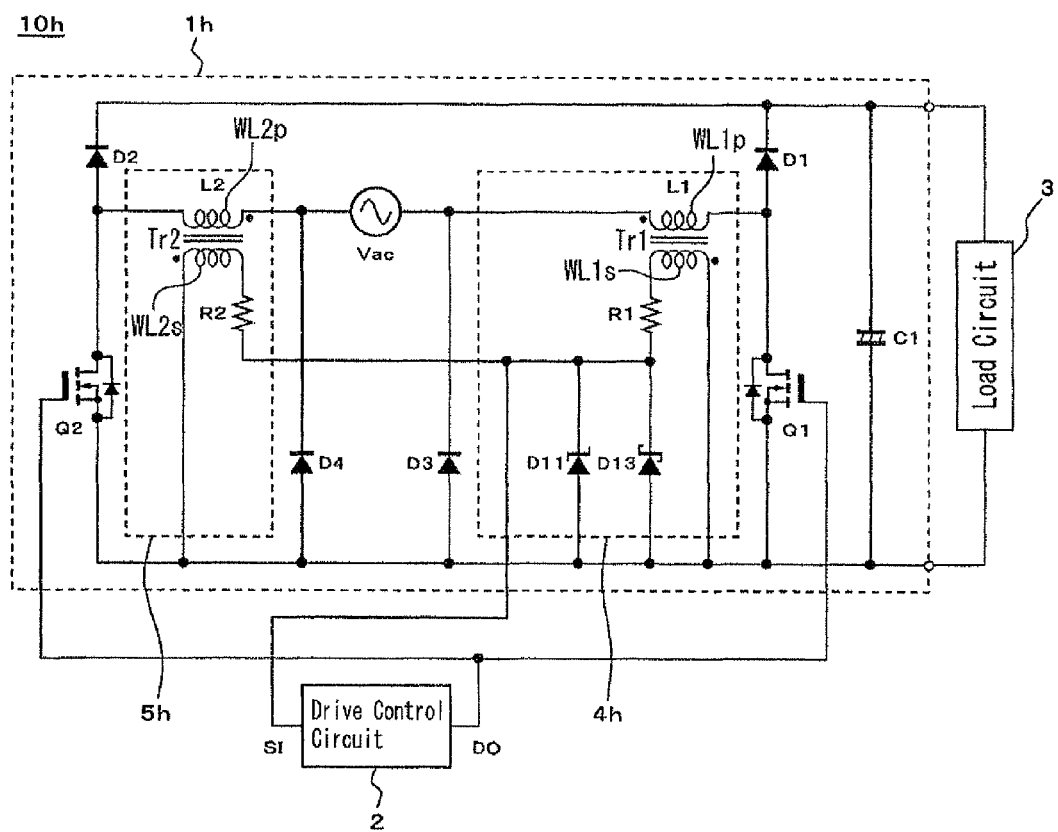
FIG. 9 is a block diagram indicating a power unit provided with a power factor correction circuit according to an eighth embodiment of the present invention.

FIG. 9 is a circuit constitution diagram illustrating a power supply apparatus 10h including a power factor correction circuit 1h according to an eighth embodiment of the present invention. The power factor correction circuit 1h differs from the power factor correction circuit 1f illustrated in FIG. 7 in that the twelfth rectifier element D12 and the fourteenth rectifier element D14 are eliminated, and thereby the power factor correction circuit 1h has a constitution including both a positive voltage clamp circuit and a negative voltage clamp circuit by the first current detector 4h and the second current detector 5h. Thereby, the circuit constitution of the power factor correction circuit 1h can be simplified, and a reduction in the cost of the apparatus can be achieved.

Figure 10:
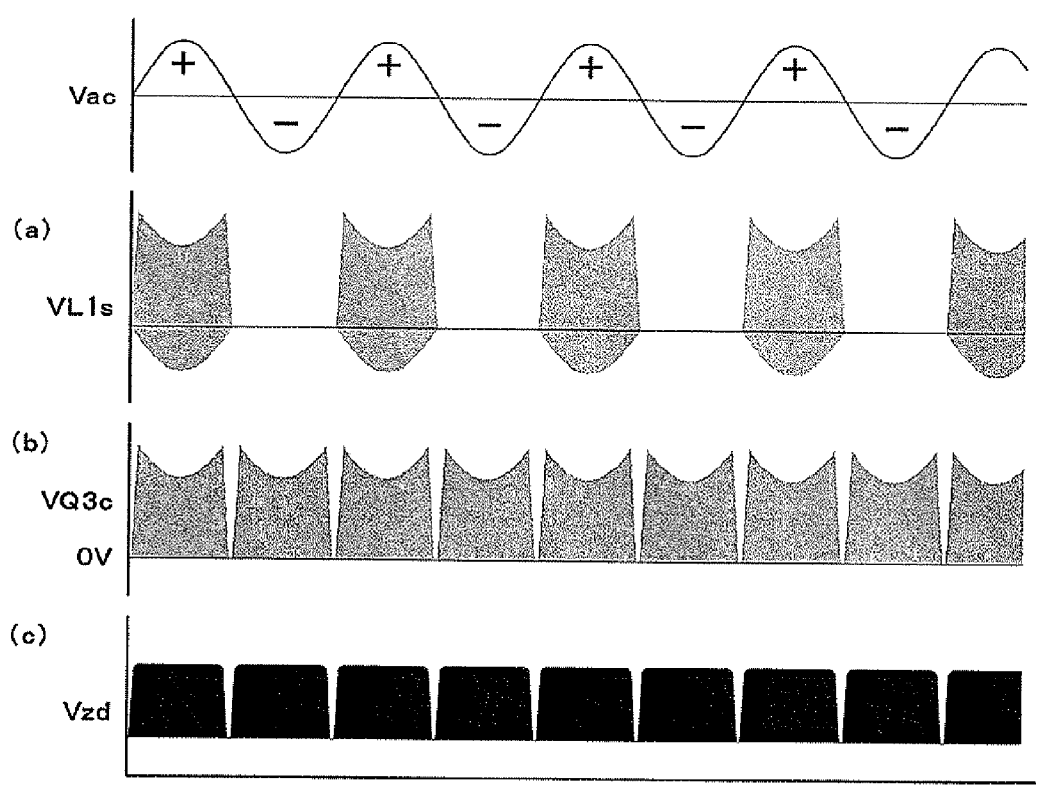
FIG. 10 is a waveform diagram indicating an operation of main parts of the power factor correction circuit shown in FIG. 2 to FIG. 8.

FIG. 10 illustrates the main parts of the waveforms showing the above-described characteristics of the power factor correction circuits 1a, 1b, and 1d to 1h illustrated in FIGS. 3 to 9. In FIG. 10, the waveforms of the AC power source Vac and the induced voltage VL1s that is generated in the secondary winding WL1s of the first transformer Tr1, which are illustrated as (a), are the same for all of the power factor correction circuits 1a, 1b, and 1d to 1h. The voltage VQ3c illustrated as (b) shows the collector-emitter voltage applied to the third switching element Q3 in the power factor correction circuits 1b and 1d illustrated in FIGS. 4 and 5. The power factor correction circuits 1b and 1d have only a negative voltage clamp circuit as explained above (a positive voltage clamp circuit is not built into each drive control circuit 2 therein). Therefore, compared to the waveform of the induced voltage VL1s, the voltage VQ3c has a waveform in which only the negative side is clamped to a predetermined Low level. Although it is not illustrated, in the power factor correction circuit 1a illustrated in FIG. 3, the voltage applied to the series circuit of the resistor R3 and the fifth rectifier element D5 also has the look-like waveform as the voltage VQ3c, but the waveform is only generated in the positive half cycle of the AC power source.

The voltages Vzd illustrated as (c) in FIG. 10 show the collector-emitter voltage and the zero current detection voltage applied to the third switching element Q3 in the power factor correction circuits 1e, 1f, 1g and 1h illustrated in FIGS. 6,7,8 and 9. The power factor correction circuits 1e, 1f, 1g and 1h have both a positive voltage clamp circuit and a negative voltage clamp circuit as described above. Therefore, compared to the waveform of the induced voltage VL1s, the voltage VQ3c, and by extension the zero current detection voltage Vzd, have waveforms in which the positive side and the negative side are respectively clamped to a predetermined High level and Low level.

Figure 11:
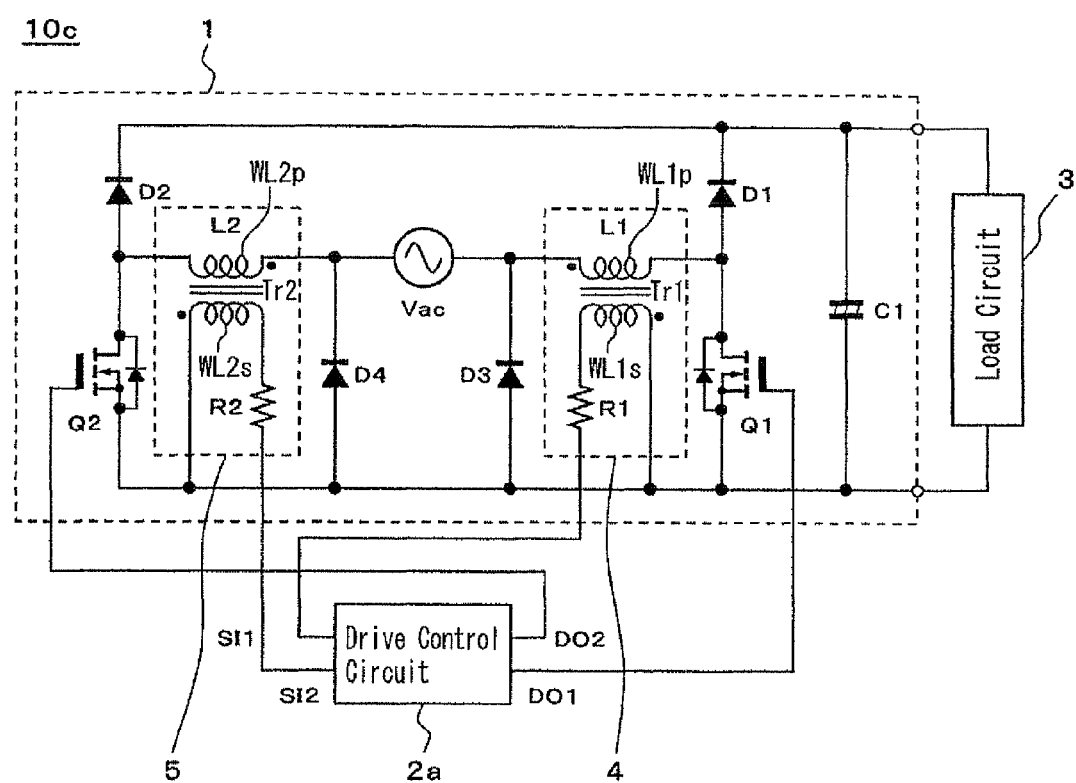
FIG. 11 is a block diagram indicating a power unit provided with a power factor correction circuit according to a ninth embodiment of the present invention.

FIG. 11 is a circuit constitution diagram illustrating a power supply apparatus 10c including a power factor correction circuit 1 according to a ninth embodiment of the present invention. The power factor correction circuit 1 illustrated in FIG. 11 has basically the same constitution as that of the power factor correction circuit 1 illustrated in FIG. 1, but differs from the power factor correction circuit 1 illustrated in FIG. 1 with respect to the following points. A drive control circuit 2a includes two zero current detection terminals SI1 and SI2 and two drive signal output terminals DO1 and DO2, the first and second current detectors 4 and 5 are connected to the different zero current detection terminals SI1 and SI2 without having their output ends commonly shared to each other, and the gate terminals of the first and second switching elements Q1 and Q2 are connected to the different drive signal output terminals DO1 and DO2.

As the drive control circuit 2a, for example, a general-purpose IC of the interleave type or the like originally for performing drive control of two switching elements can be suitably used.

Preferred embodiments of the present invention have been described above. However, the power factor correction apparatus according to the present invention is not limited to the above-described embodiments. For example, although not illustrated, the power factor correction apparatus according to the present invention may be equipped with a function in which an abnormal condition in the apparatus such as a stop in the AC power source Vac is detected, and thereby the ON/OFF operation of the first and second switching elements Q1 and Q2 is stopped in the OFF state. In this case, by connecting resistors between the gate and source of the first and second switching elements Q1 and Q2, the gates can be reliably turned OFF.

The embodiments that have been explained are configured such that a path is secured in which a current is supplied when a negative voltage is generated on the secondary side of the first and second transformers, and thereby the generation of excessive negative voltage on the secondary side of the first and second transformers can be suppressed. The constitution for achieving this object is not limited to that in the embodiments used in the above explanations.

What is claimed is:

1. A power factor correction circuit comprising:
a first series circuit consisting of a first rectifier element and a first switching element;
a second series circuit consisting of a second rectifier element and a second switching element, the second series circuit being configured to connect to the first series circuit in a parallel connection;
a smoothing capacitor connected to the first series circuit and the second series circuit and a load circuit in a parallel connection;
a first reactor that has one end and another end, the one end of the first reactor being connected to a connecting point of the first rectifier element and the first switching element, and the other end of the first reactor being connected to one end of an AC power source;
a second reactor that has one end and another end, the one end of the second reactor being connected to a connecting point of the second rectifier element and the second switching element, and the other end of the second reactor being connected to another end of the AC power source;
a third rectifier element connecting between a connecting point of the AC power source and the first reactor and a connecting point of the first switching element and the second switching element; and
a fourth rectifier element connecting between a connecting point of the AC power source and the second reactor and a connecting point of the first switching element and the second switching element, wherein:
1) the power factor correction circuit further includes a first current detector and a second current detector that detect a reactor current from the AC power source,
the first current detector having a first transformer, a primary part of which consists of the first reactor, and a resistor, one end of the resistor of the first current detector being connected to a secondary winding that constitutes a secondary side of the first transformer, and another end of the resistor of the first current detector constituting an output end of the first current detector, and
the second current detector having a second transformer, a primary part of which consists of the second reactor, and a resistor, one end of the resistor of the second current detector being connected to a secondary winding that constitutes a secondary side of the second transformer, and another end of the resistor of the second current detector constituting an output end of the second current detector;
2) the first switching element and the second switching element are controllable based on a first output signal output according to the reactor current from the output end of the first current detector on the secondary side of the first transformer, and a second output signal output according to the reactor current from the output end of the second current detector on the secondary side of the second transformer;
3) a desired DC voltage is allowed to supply to the load circuit;
4) the first output signal and the second output signal are generable based on an induced voltage to be generated on each of the secondary side of the first transformer and the secondary side of the second transformer, and
a polarity of the induced voltage to be generated on the secondary side of the first transformer in accordance with ON/OFF of the first switching element in a positive half cycle of the AC power source is adapted to match a polarity of the induced voltage to be generated on the secondary side of the second transformer in accordance with ON/OFF of the second switching element in a negative half cycle of the AC power source; and
5) the output end of the first current detector is adapted to be commonly shared with the output end of the second current detector, wherein a negative voltage clamp circuit with the resistor of the second current detector, one end of which constitutes the output end of the second current detector, is serially connected to the output end of the first current detector, and a negative voltage clamp circuit with the resistor of the first current detector, one end of which constitutes the output end of the first current detector, is serially connected to the output end of the second current detector.

2. The power factor correction circuit according to claim 1, wherein, on each of the secondary side of the first transformer and the secondary side of the second transformer, the following rectifier elements are each connected:
- a rectifier element to be conducted when a positive voltage is generated at the first transformer; and
- a rectifier element to be conducted when a positive voltage is generated on the secondary side of the second transformer.

3. A power factor correction circuit comprising:
- a first series circuit consisting of a first rectifier element and a first switching element;
- a second series circuit consisting of a second rectifier element and a second switching element, the second series circuit being configured to connect to the first series circuit in a parallel connection;
- a smoothing capacitor connected to the first series circuit and the second series circuit and a load circuit in a parallel connection;
- a first reactor that has one end and another end, the one end of the first reactor being connected to a connecting point of the first rectifier element and the first switching element, and the other end of the first reactor being connected to one end of an AC power source;
- a second reactor that has one end and another end, the one end of the second reactor being connected to a connecting point of the second rectifier element and the second switching element, and the other end of the second reactor being connected to another end of the AC power source;
- a third rectifier element connecting between a connecting point of the AC power source and the first reactor and a connecting point of the first switching element and the second switching element; and
- a fourth rectifier element connecting between a connecting point of the AC power source and the second reactor and a connecting point of the first switching element and the second switching element, wherein:
  1) the power factor correction circuit further includes a first current detector and a second current detector that detect a reactor current from the AC power source, the first current detector having a first transformer, a primary part of which consists of the first reactor, and the second current detector having a second transformer, a primary part of which consists of the second reactor;
  2) the first switching element and the second switching element are controllable based on a first output signal output according to the reactor current from a secondary side of the first transformer and a second output signal output according to the reactor current from a secondary side of the second transformer;
  3) a desired DC voltage is allowed to supply to the load circuit;
  4) the first output signal and the second output signal are generable based on an induced voltage to be generated on each of the secondary side of the first transformer and the secondary side of the second transformer, and
  a polarity of the induced voltage to be generated on the secondary side of the first transformer in accordance with ON/OFF of the first switching element in a positive half cycle of the AC power source is adapted to match a polarity of the induced voltage to be generated on the secondary side of the second transformer in accordance with ON/OFF of the second switching element in a negative half cycle of the AC power source;
  5) an output end of the first output signal on the secondary side of the first transformer is adapted to be commonly shared with an output end of the second output signal on the secondary side of the second transformer; and
  6) a first positive voltage clamp circuit, which clamps positive voltage in case the positive voltage is generated on the secondary side of the first transformer, and a first negative voltage clamp current which clamps negative voltage in case the negative voltage is generated on the secondary side of the first transformer, are connected to the secondary side of the first transformer; and
  a second positive voltage clamp circuit, which clamps positive voltage in case the positive voltage is generated on the secondary side of the second transformer, and a second negative voltage clamp circuit, which clamps negative voltage in case the negative voltage is generated on the secondary side of the second transformer, are connected to the secondary side of the second transformer.

4. The power factor correction circuit according to claim 3, wherein the first current detector and the second current detector commonly share one of the positive voltage clamp circuits and one of the negative voltage clamp circuits.

5. The power factor correction circuit according to claim 3, wherein on each of the secondary side of the first transformer and the secondary, side of the second transformer, the following rectifier elements are each connected:
- a rectifier element to be conducted when a positive voltage is generated at the first transformer; and
- a rectifier element to be conducted when a positive voltage is generated on the secondary side of the second transformer.

* * * * *